United States Patent
Gordon et al.

(10) Patent No.: US 10,016,914 B1
(45) Date of Patent: Jul. 10, 2018

(54) POSITIVE DISPLACEMENT MOLDING OF PLASTIC PARTS

(75) Inventors: N. Ross Gordon, Kennewick, WA (US); Scott J. Dilly, Oregon City, OR (US); Kevin L. Simmons, Kennewick, WA (US); Leslie J. Woodcock, Benton City, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 0 days.

(21) Appl. No.: 07/923,416

(22) Filed: Jul. 31, 1992

(51) Int. Cl.
*B29C 33/40* (2006.01)
*B29C 33/22* (2006.01)
*B29C 33/42* (2006.01)

(52) U.S. Cl.
CPC .............. *B29C 33/40* (2013.01); *B29C 33/22* (2013.01); *B29C 2033/422* (2013.01)

(58) Field of Classification Search
CPC .... B29C 33/40; B29C 33/22; B29C 2033/422
USPC ....... 264/108, 322, 325, 24, 328.16, 328.12, 264/326.7
See application file for complete search history.

(56) References Cited

U.S. PATENT DOCUMENTS

| | | | | | |
|---|---|---|---|---|---|
| 2,949,054 | A | * | 8/1960 | White | 264/108 |
| 3,236,928 | A | * | 2/1966 | Blume, Jr. | 264/108 |
| 3,378,613 | A | * | 4/1968 | Hampshire | 264/108 |
| 3,590,114 | A | * | 6/1971 | Uhlig | 264/328.16 |
| 3,655,863 | A | * | 4/1972 | Andersen et al. | 264/325 |
| 5,061,423 | A | * | 10/1991 | Layden | 264/108 |

FOREIGN PATENT DOCUMENTS

DE 1143629 * 2/1963 ............. 264/108

* cited by examiner

*Primary Examiner* — Liam J Heincer
(74) *Attorney, Agent, or Firm* — Derek H. Maughan (57) ABSTRACT

The present invention is a method and apparatus for molding plastic parts and placing and orienting reinforcing fibers within structurally thin sections. More specifically, the method of the present invention is a molding technique wherein positive displacement is applied to incremental sections of a charge (plastic mixed with reinforcing fibers), thereby sequentially forming the desired part and placing reinforcing fibers within structurally thin sections. The apparatus of the invention is a moveable ram that may be tapered and that is in contact with the charge during forming.

4 Claims, 14 Drawing Sheets

POSITIVE DISPLACEMENT MOLDING OF PLASTIC PARTS

This invention was made with Government support under Contract DE-AC06-76RLO 1830 awarded by the U.S. Department of Energy. The Government has certain rights in the invention.

FIELD OF THE INVENTION

The present invention relates generally to a method and apparatus for molding plastic parts and placing reinforcing fibers within structurally thin sections. More specifically, the method of the present invention is a molding technique wherein positive displacement is applied to incremental sections of a charge (plastic mixed with reinforcing fibers), thereby sequentially forming the desired part and placing reinforcing fibers within structurally thin sections. The apparatus of the invention is a moveable ram that may be tapered and that is in contact with the charge during forming.

BACKGROUND OF THE INVENTION

Molding of materials is well known and is especially useful in forming parts of plastic materials. Compression and injection molding are two of the most used plastic molding techniques for molding both "pure" plastics and reinforced plastics. Impregnating reinforcing fibers with a plastic significantly enhances the mechanical strength of the molded parts. It is desirable that the reinforcing fibers are evenly distributed throughout a part. In parts having complex shapes and variations between thick and thin sections, finished parts often lack reinforcing fibers in the thin sections. Upon entry to a thin section, reinforcing fibers collect and form a bridge across the opening into the thin section resulting in reduced fiber density in the thin section. This is, in part, due to the fact that the constant hydraulic pressure throughout the charge results in a small force when multiplied by an area of an entrance into a section of small cross sectional area. Another factor is that when a reinforcing fiber "hangs up", fluid will flow around it and reduce the force on the fiber. This is particularly apparent in structures like bolts that have a central section of large cross section and protruding sections (threads) of much smaller cross section.

Another structure exhibiting a large cross section with protruding sections of smaller cross section is a sabot. A sabot is placed on the circumference of a rod shaped artillery projectile when the projectile is of smaller diameter than the gun barrel. With the sabot and projectile filling the entire cross section of a gun barrel, there is more force applied to the projectile and it is guided straight through the gun barrel. Upon exiting the gun barrel, the sabot breaks free of the projectile.

It is imperative that the sabot remain with the projectile until it leaves the gun barrel. This may be achieved by forming external parallel grooves and ribs on the projectile and by forming mating internal parallel grooves and ribs on the sabot. These parallel grooves and ribs are referred to as buttress threads. Because of the high forces experienced by the projectile/sabot assembly within the gun barrel, the buttress threads must have high strength. Sabots are presently made of aluminum and are required to have shear strength sufficient to withstand gun chamber pressures of 60,000 psi. Because it is advantageous that the sabot be lightweight and, inexpensive, it is desirable to use reinforced plastic to make the sabot. Conventional plastic forming techniques, compression molding, or injection molding leave the buttress threads without reinforcing fibers and without sufficient strength to reliably retain the sabot with the projectile. According to unpublished data of the US Army Armament Research Development & Engineering Center, Picatinny Arsenal, sabots formed by conventional molding techniques have exhibited thread shear strengths from about 6,000 psi to about 12,000 psi with an average of about 8,000 psi for a sample of 9 tests, and failed under gun chamber pressures between from about 10,000 psi to about 13,000 psi.

In either compression or injection molding, the charge has a very high viscosity. Hence, unlike water that cannot support a force in a given direction, the charge tends to flow in the direction of the applied pressure and is resistant to flow laterally into interstices. It is this viscous flow resistance that inhibits movement of reinforcing fibers into interstices. Thus, standard molding practice of deforming the entire charge results in under-reinforced thin sections or interstices.

SUMMARY OF THE INVENTION

The method of the present invention achieves placement of reinforcing fibers into thin sections of a molded part for either compression molding or injection molding by incrementally forming the charge.

The apparatus of the present invention is a moveable ram that may be tapered and is in contact with the charge.

In one embodiment of the invention, as related to compression molding, a preformed charge may be placed within a mold while a ram compresses the preformed charge incrementally, wherein the ram applies a transverse or radial displacement to the charge increasing flow of the charge into interstices.

In another embodiment of the invention, as related to injection molding, a ram is displaced from the mold as the melted charge is introduced into the mold cavity. Thus, interstices are filled under pressure sequentially as the ram is displaced. Adding a taper to the ram enhances application of a transverse or radial displacement to the charge to increase flow of charge into interstices.

In further detailed descriptions, displacements are radial because of the shape of the parts selected for development. It is apparent to one skilled in the art, however, that the invention is applicable to parts of other shapes in which displacements are not radial, for lack of a radius of curvature, but which may be described as transverse or lateral.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

In order to best understand the present invention, a discussion of the prior art is needed.

Prior Art

Figure 1:
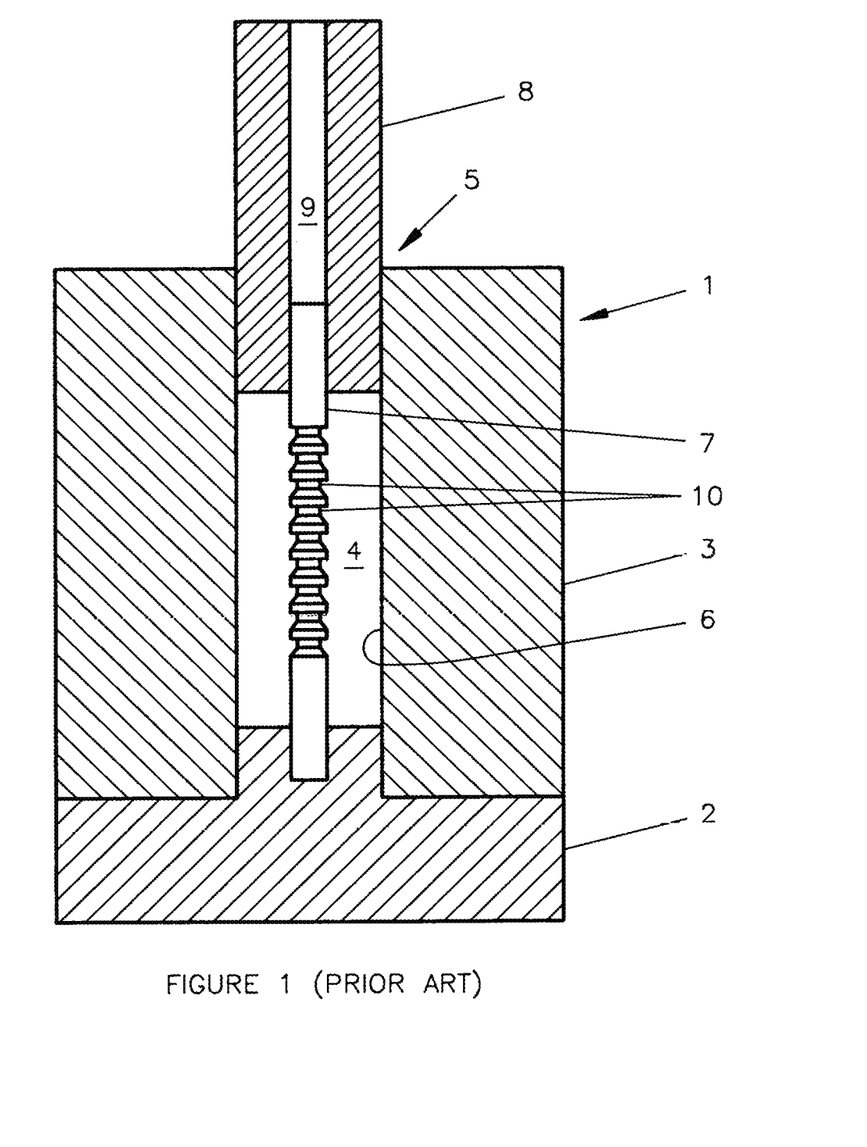
FIG. 1 is a cross sectional view of a prior art compression mold.

In compression molding, as illustrated in FIG. 1, a compression mold (1) generally is heatable and comprises a first end that is closed or base plate (2) with a sidewall (3) forming a mold cavity (4) and further having a second end (5) open to receive a charge (plastic mixed with reinforcing fibers). In general, detailed features of the part to be molded may be present on the interior surface (6) of the sidewall (3), or as shown, on a core (7). In the absence of a core (7), the ram (8) would be solid. In this example, the ram (8) is a right circular cylinder having a central hole (9) permitting clearance of the core (7). The ram (8) may be of any cross sectional shape matching the interior cross sectional shape of the mold cavity. A charge (not shown) is placed within the cavity (4) of the mold (1). The charge may be preformed to fit the cavity or be loose granular or pellet-like material. The mold is closed and heated, thereby heating and softening the charge. Upon reaching the desired temperature, the entire charge is mechanically compressed with the ram (8). Softened plastic material within the charge flows under pressure, filling the mold cavity and interstices; for example, parallel grooves or buttress threads (10). The ram (8) is displaced, compressing the entire charge. The charge, having a high fluid viscosity, deforms and flows into interstices in the mold cavity. Reinforcing fibers flow with the plastic material, but tend to form bridges at entrances to interstices resulting in plastic resin flowing past the fiber bridges into the interstices thereby leaving the interstices without reinforcing fibers. When all interstices are filled, the ram (8) can no longer be displaced because of the incompressible nature of the softened plastic charge. Pressure on the ram (8) is increased to ensure that all of the interstices are completely filled with plastic.

Figure 2:
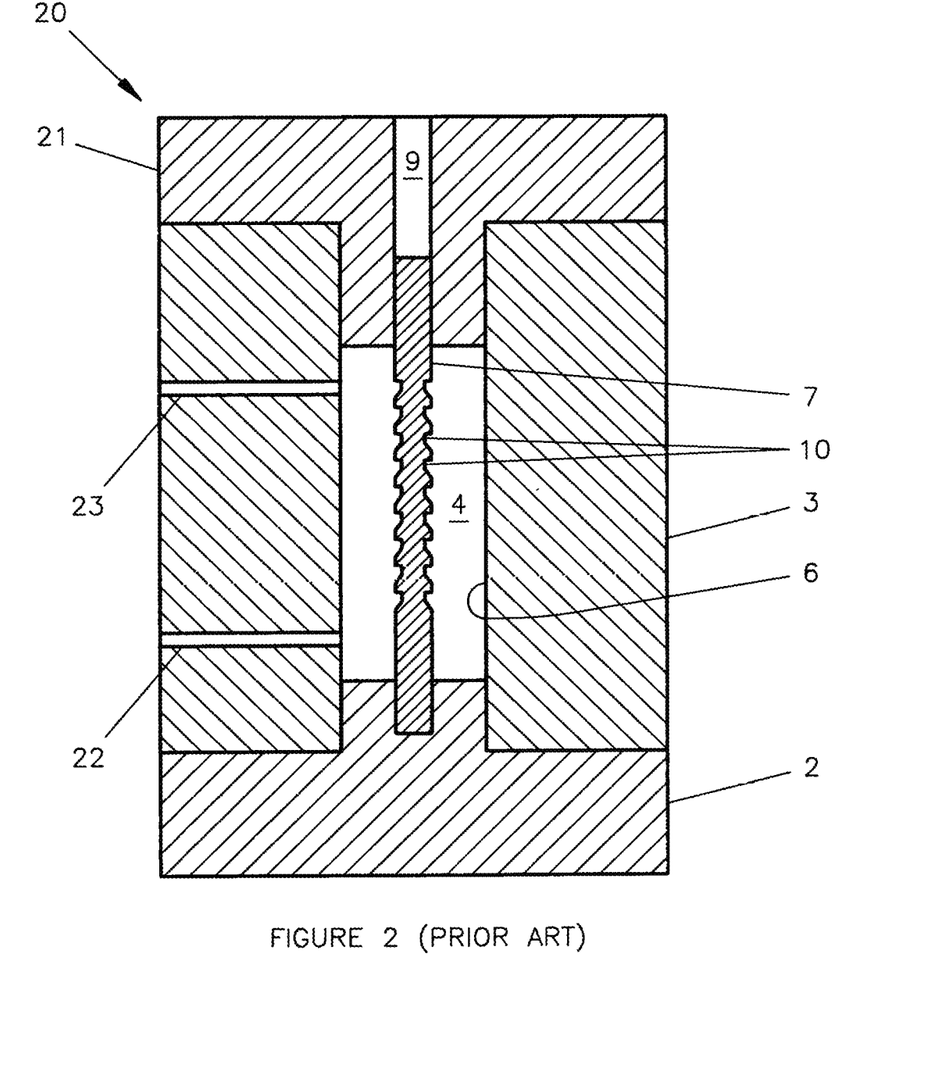
FIG. 2 is a cross sectional view of a prior art injection mold.

Injection molding is similar to compression molding except that the charge is introduced into a mold cavity in a semi-liquid state. In FIG. 2, the injection mold (20) is characterized by a cap plate (21) in place of the ram (8) of the compression mold (1). Liquid charge is introduced into the heated mold cavity (4) through at least one gate (22) while air and excess charge exit the mold cavity (4) through at least one vent (23). Liquid charge flows until the mold cavity (4) is filled. At this point, no further flow is possible because of the incompressible nature of the liquid charge. Pressure is increased to ensure that charge material completely fills all of the interstices within the mold (20).

However, use of conventional plastic molding techniques, while successfully filling all interstices, does not provide consistent distribution of reinforcing fibers in sections of small cross sectional area as in sections of large cross sectional area. Reinforcing fibers tend to form a bridge across an entrance into a section of small cross sectional area rather than enter that section. Hence, features such as buttress threads or spiral threads do not have the same level of reinforcement as the body of the part.

The Present Invention

The present invention overcomes the problem of getting reinforcement fibers into thin sections of a part from a main body of the part by using a ram moveable along the length of the plastic part and imparting a transverse or radial positive displacement to the material as the ram is moved in a longitudinal direction. The radial displacement pushes the entire charge including reinforcing fibers into thin sections of the mold cavity. As the reinforcing fibers enter thin sections, they are aligned by the flow of plastic. Thus, the thin sections of the plastic part have substantially the same amount of reinforcing fibers as the main body of the part. Additionally, the reinforcing fibers are aligned in a transverse or radial orientation within the thin sections.

Compression Molding

Figure 3A:
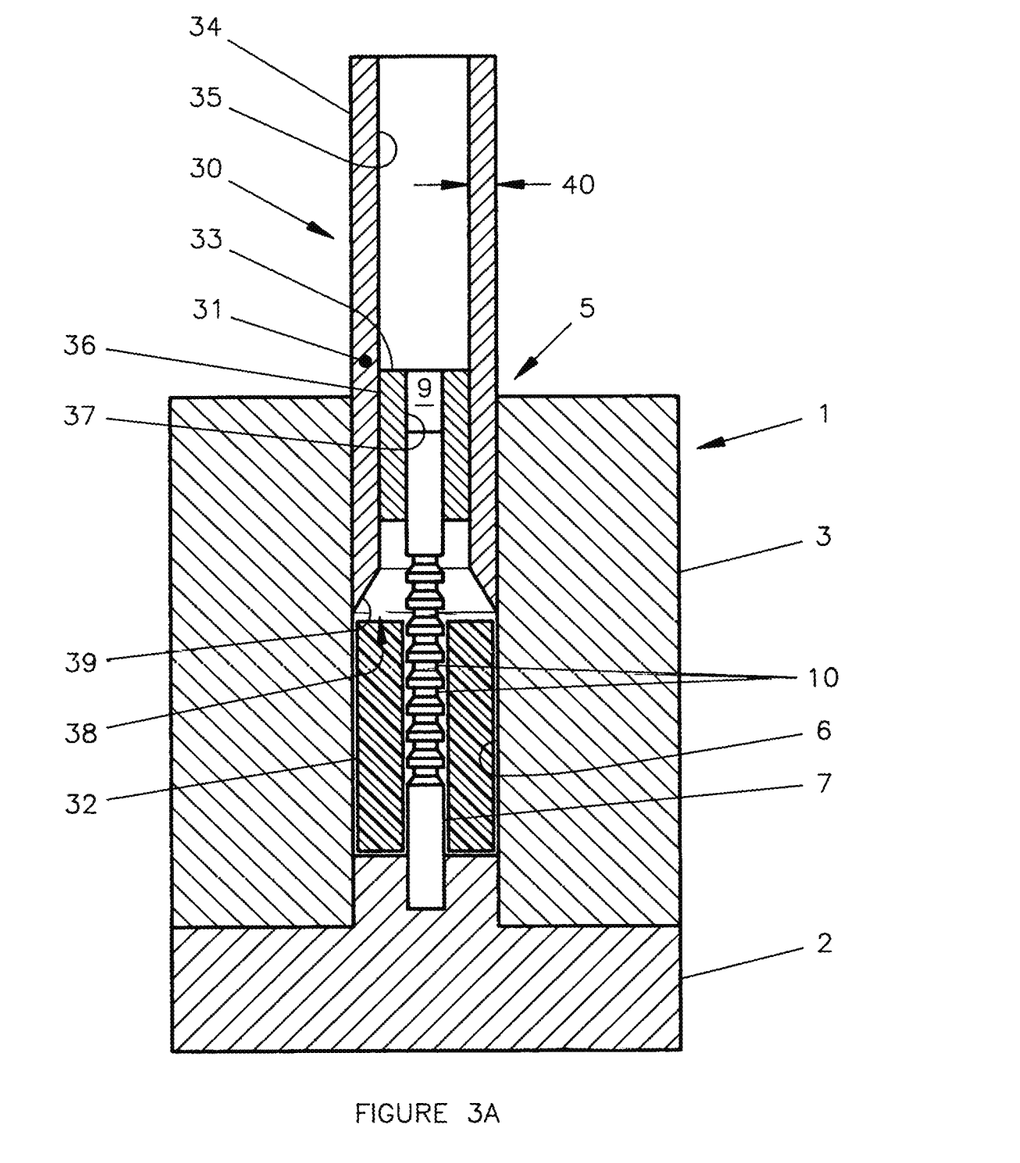
FIG. 3a is a cross sectional view of a first embodiment of a compression mold, prior to compression, according to the present invention.

According to the present invention, in a compression mold (1) the conventional ram (8) is replaced by a two-part ram (30) as shown in FIG. 3a. The outer ram (31) may have any cross sectional shape that matches the cross sectional shape of the mold cavity and that is moveable along the length of the charge (32). In FIG. 3a, the outer ram (31) is a hollow right circular cylinder. The inner ram (33) rests on the charge (32) and is held in place by holding means (not shown). The inner ram (33) may be of any cross sectional shape matching the cross sectional shape of the outer ram (31). In FIG. 3a, the inner ram (33) is a hollow right circular cylinder. The holding means may be any holding means, including but not limited to a spring or a hydraulic cylinder.

The outer ram (31) has a first length, an outer surface (34), and an inner surface (35). The outer surface (34) is sealably slidable upon the interior surface (6) of the mold (1). The inner ram (33) has a second length shorter than the first length of the outer ram (31) and the inner ram (33) has an outer surface (36) slidable sliceable within the inner surface (35) of the outer ram (31). The inner ram (33) further has an inner surface (37) sealably sliceable upon a core (7) having thin sections, wherein said inner ram (33) is held in place while the outer ram (31) is displaced longitudinally along the length of the charge (32). The inner ram (33) maintains pressure on the charge (32) and constrains the charge (32) from flowing in a longitudinal direction.

The outer ram (31) has a first end (38). The first end (38) may be of any geometry, but it is preferred that a taper (39) be provided to facilitate getting the wall thickness (40) of the outer ram (31) between the inner surface (6) of the sidewall (3) and the charge (32). A lateral or radial displacement is thereby imparted to the charge (32) to place reinforcing fibers within the parallel grooves (10). Because the displacement is radial, and the reinforcing fibers are aligned in the direction of the flow, the reinforcing fibers are aligned in a radial orientation.

Figure 3B:
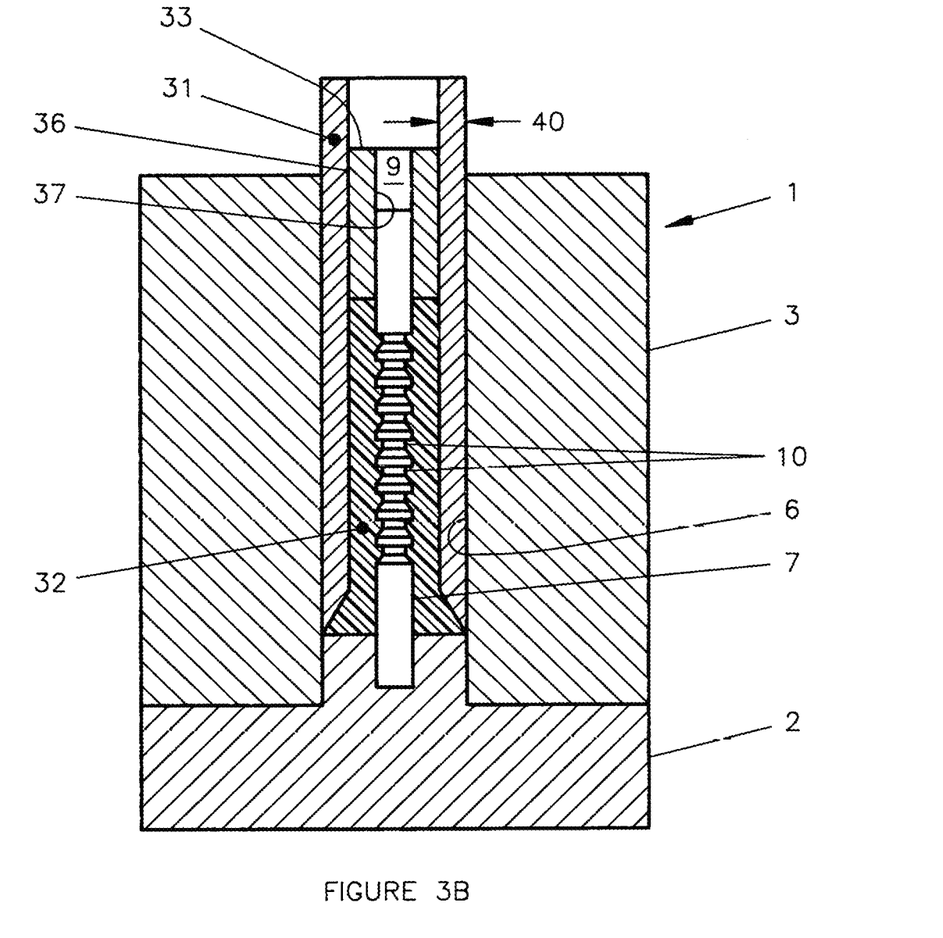
FIG. 3b is a cross sectional view of a first embodiment of a compression mold, after compression, according to the present invention.

In operation, the outer ram (31) starts in the first position shown in FIG. 3a, and is moved into the second position in FIG. 3b. In the interim, radial displacement is applied as the wall thickness (40) of the outer ram (31) displaces a portion of the charge (32) toward the core (7). This mechanical positive displacement is in contrast to the displacement obtainable by hydraulic forces in conventional compression molding.

When the outer ram (31) is in the second position as in FIG. 3b, pressure on the outer ram (31) is increased, forcing a bit of charge through a vent (not shown). This pressurization ensures complete filling of the mold cavity and interstices, such as buttress threads (10).

Figure 4A:
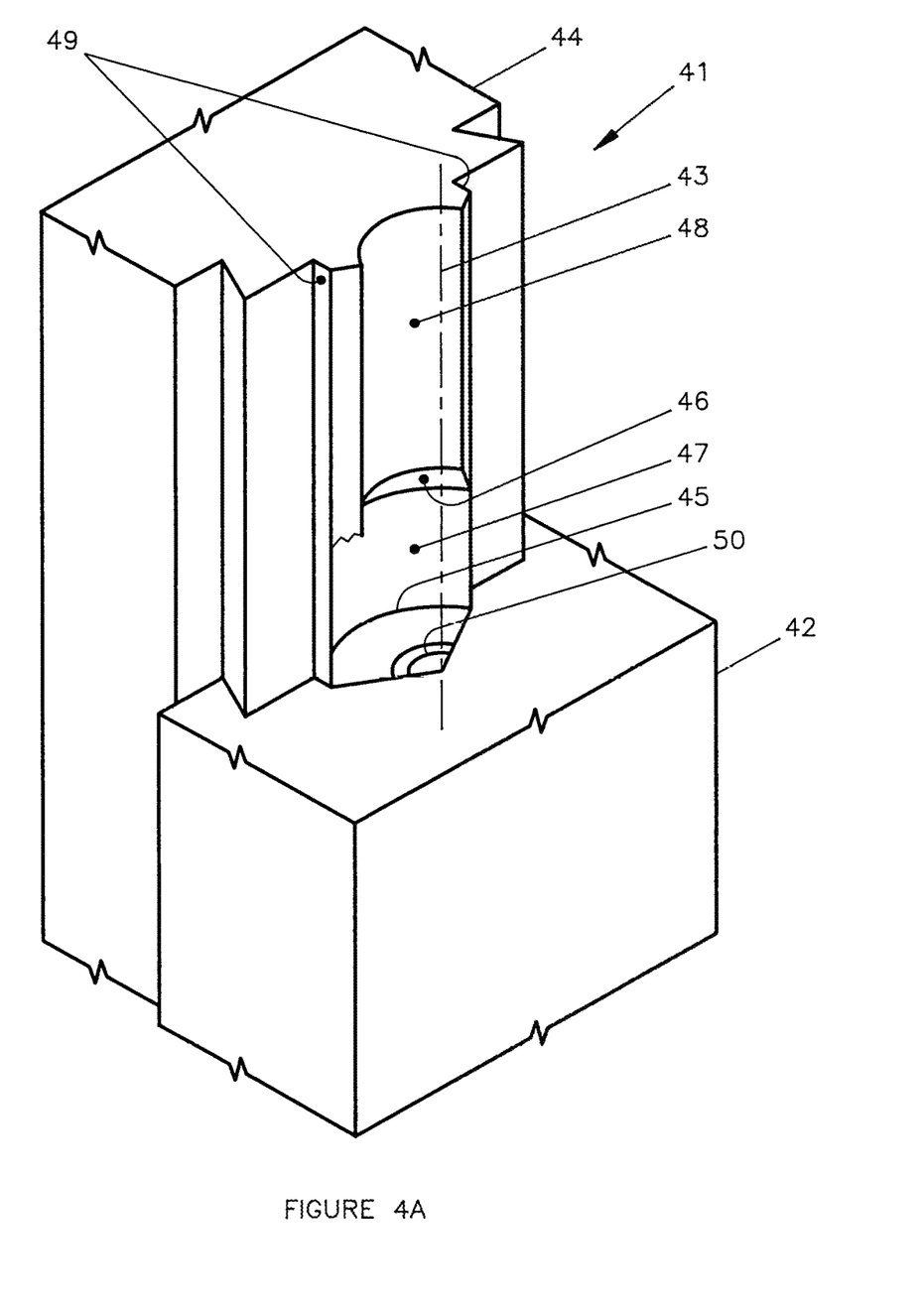
FIG. 4a is an isometric view of a second embodiment of a compression mold according to the present invention.

An alternative embodiment of a moveable ram compression mold (41) is shown in FIG. 4. In FIG. 4a, a two-part mold comprises a slotted sidewall (42) having a centerline (43), the slotted sidewall (42) slidably and sealably receiving a dovetailed sidewall (44) for molding a charge (45). The dovetailed sidewall (44) has a tapered surface (46) joining a first inner surface (47) to a second inner surface (48), with the second inner surface (48) located closer to the centerline (43) than the first inner surface (47). Although not necessary for the invention, it is preferred that the dovetailed sidewall (44) have sidewings (49) to prevent escape of charge material from the mold cavity into the slots between the dovetailed sidewall (44) and the slotted sidewall (42). The inner surfaces may be of any cross sectional shape but, as shown in FIG. 4, it is preferred that the inner surfaces be concave for making sabots.

Figure 4B:
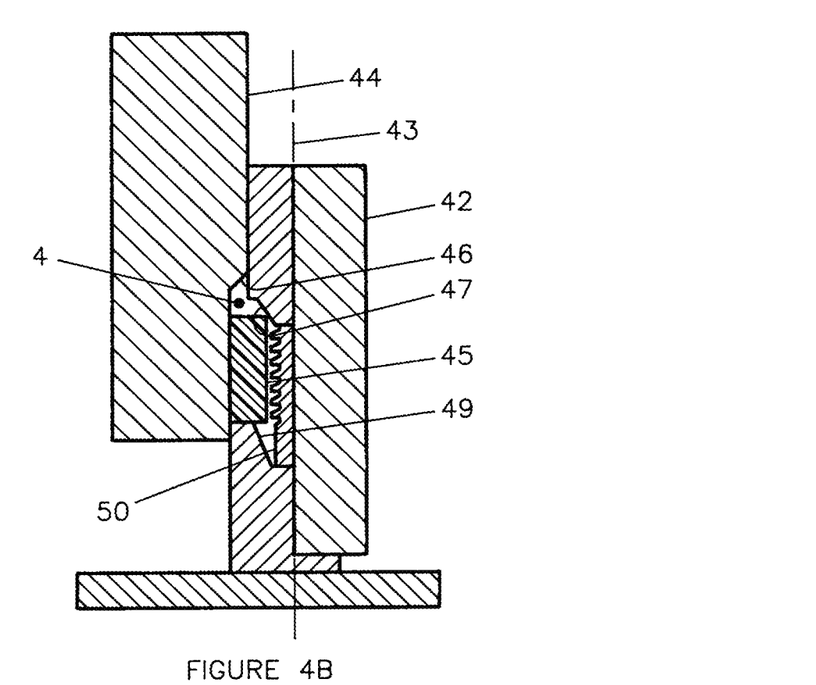
FIG. 4b is a cross sectional view of a second embodiment of a compression mold, prior to compression, according to the present invention.
Figure 4C:
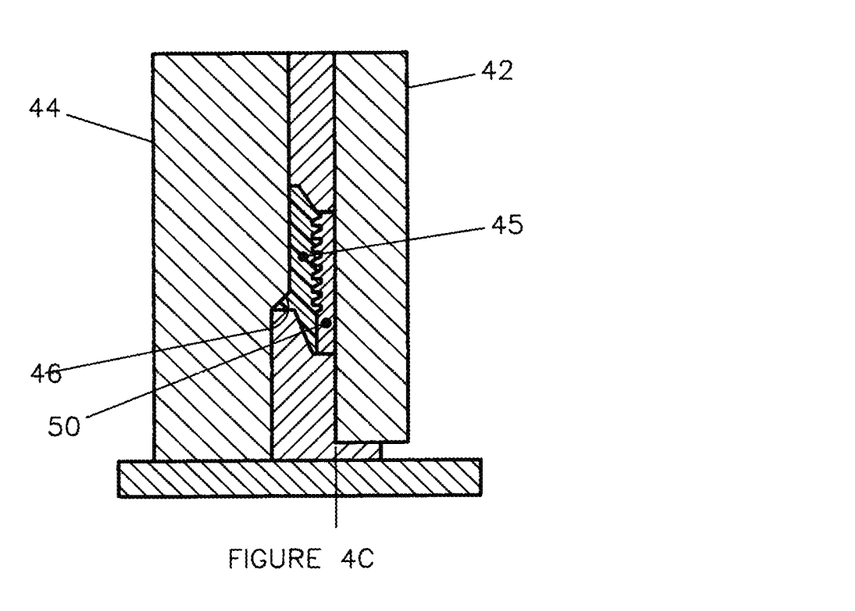
FIG. 4c is a cross sectional view of a second embodiment of a compression mold, after compression, according to the present invention.

FIGS. 4b and 4c show the molding process after the charge (45) is placed within the mold (41). The length of charge (41) is substantially parallel to the longitudinal centerline (43). The dovetailed sidewall (44) is moved and so acts as a ram so that the tapered surface (46) contacts the charge (45). Upon contact of the tapered surface (46) with the charge (45), the contacted portion of the charge (45) is displaced toward the slotted sidewall (42). The displacement increases until the second inner surface (48) is in contact with the charge (45) after which there is no further radial displacement of the contacted portion of the charge (45). There is a small amount of longitudinal flow toward first and second stationary surfaces (47 and 49). The dovetailed sidewall (44) is moved until the entire length of the charge (45) has been displaced.

The amount of material within the charge (45) is selected to just fill the mold cavity (4) when the mold (41) is closed as in FIG. 4c. The first and second stationary surfaces (47 and 49) constrain the charge (45) to flow in a substantially radial direction thereby placing and radially orienting reinforcing fibers within the interstices.

The charge (44) and mold cavity formed between the sidewalls may be of any shape for molding a part. In FIG. 4, they are shaped to produce one third of the circumference of a sabot. A center member (50) having buttress threads is positioned within the slotted sidewall (42) for forming internal buttress threads on the charge (45).

Figure 5:
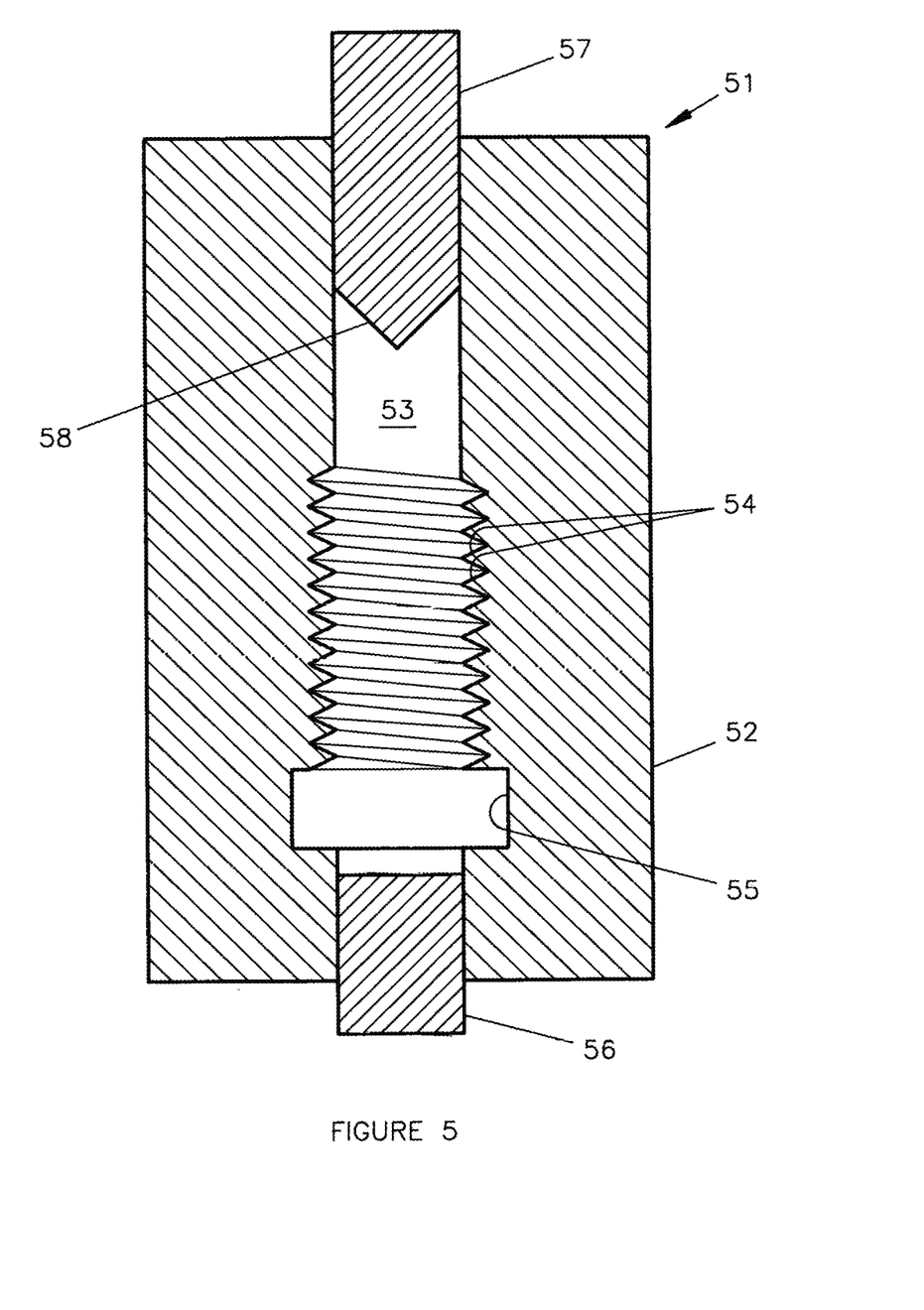
FIG. 5 is a cross sectional view of a third embodiment of a compression mold according to the present invention.

Forming external threads may be done using an apparatus as shown in FIG. 5. The mold (51) has sidewalls (52) forming a cavity (53) defining threads (54) and a screw head (55). A control ram (56) is admitted at one end of the mold (51) and preferably at the end defining the screw head (55). A follower ram (57) is admitted into the mold (51) at the end opposite the control ram (56). The end (58) of the follower ram (57) that is within the mold cavity (53) may be of any surface shape, but is preferably tapered.

In operation, the follower ram (57) is inserted into the mold cavity (53) so that the end (58) is within the screw head (55). A charge is placed within the mold cavity (53) in contact with the follower ram (58) and heated. The control ram (56) applies pressure to the charge. The charge deforms and fills the available volume within the mold cavity (53) and begins pushing the follower ram (58). The follower ram (58) maintains pressure on the charge as the control ram (56) pushes the charge into the mold cavity (53) and pushes the follower ram (58) out of the mold cavity (53). The taper on the end (58) of the follower ram (58) imparts a radial displacement to the charge for filling the threads (54).

As the charge fills the mold cavity (53), the bolt head (55) is filled first. The threads (54) nearest the bolt head (55) are filled next and so on. In this manner, the charge has a longitudinal displacement component through the center of the mold in addition to the radial displacement component on the sides of the mold.

At the end of the stroke, when the control ram (56) is in final position, the control ram (57) is prevented from moving, and pressure on the control ram (56) is increased until a small amount of charge exits a vent (not shown).

Figure 6A:
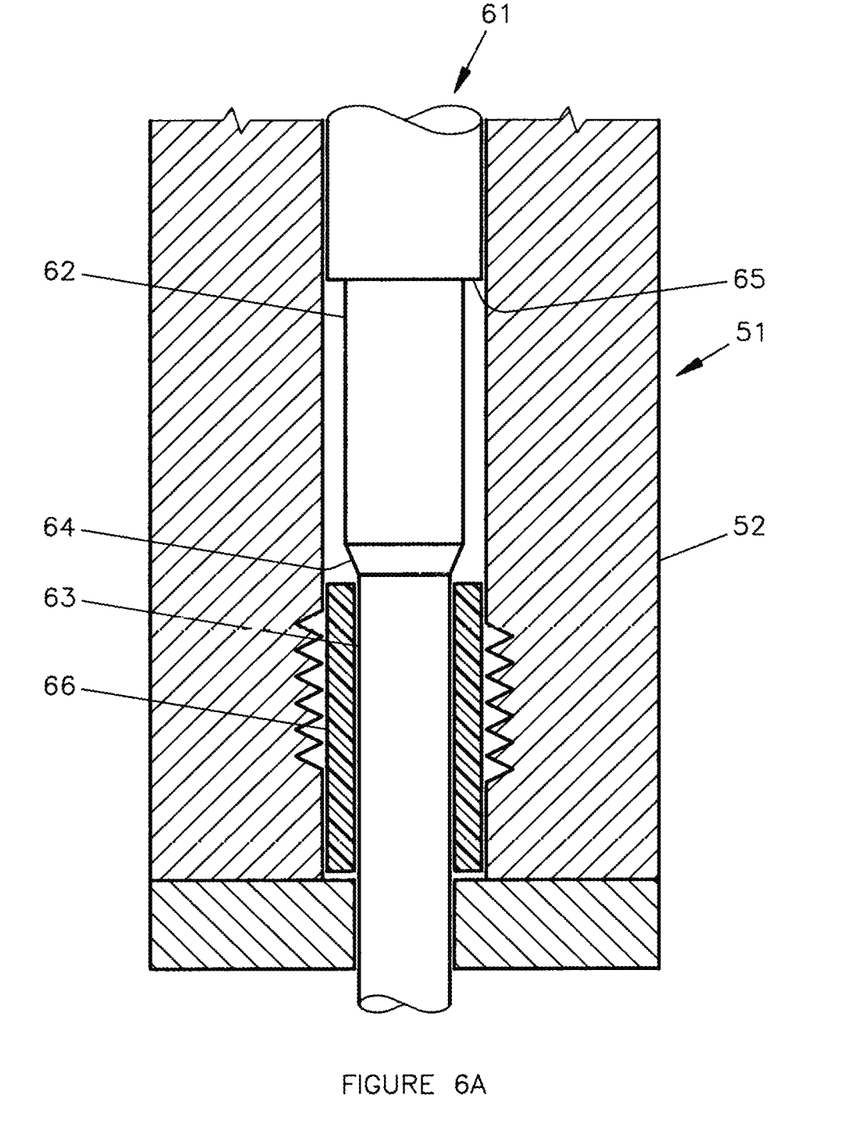
FIG. 6a is a cross sectional view of a fourth embodiment of a compression mold according to the present invention.
Figure 6B:
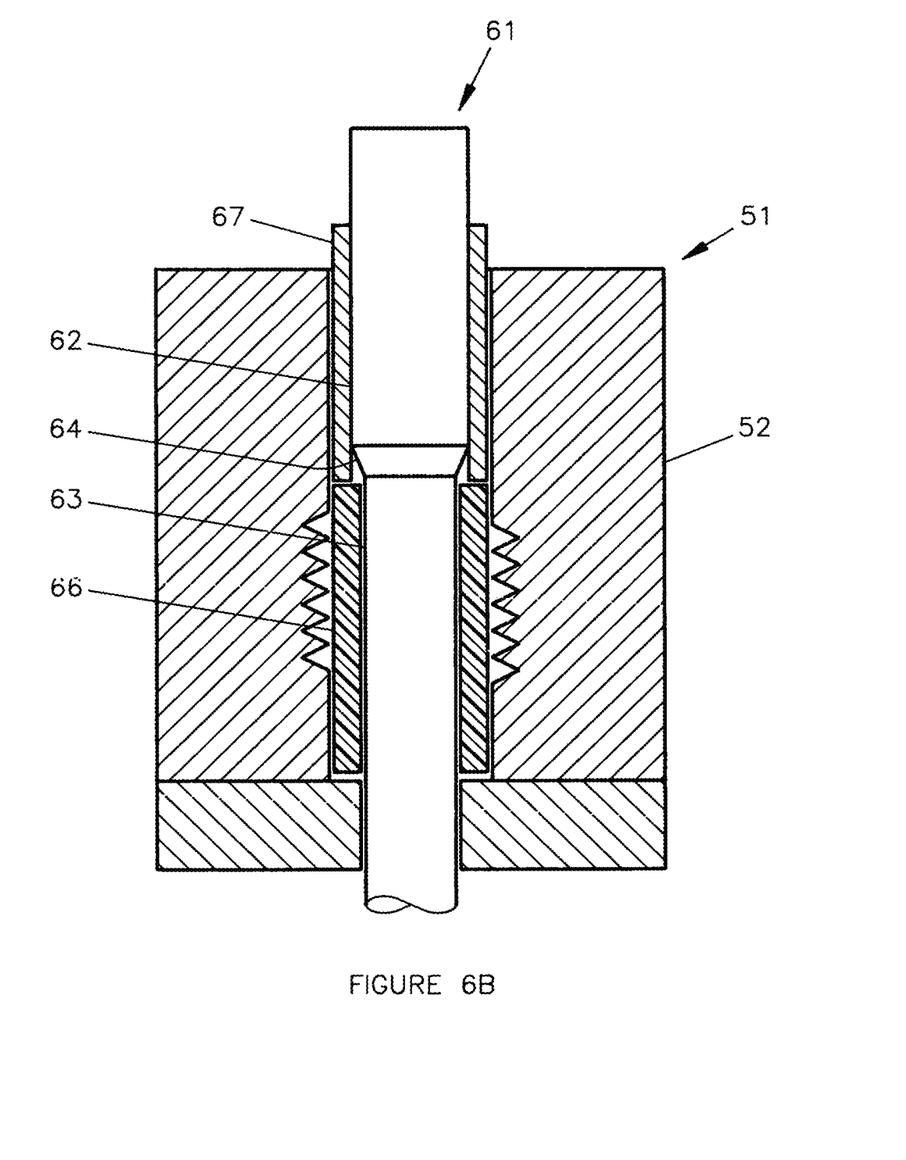
FIG. 6b is a cross sectional view of a fifth embodiment of a compression mold according to the present invention.

External threads may be formed with the apparatus shown in FIGS. 6a and 6b. The mold is the same as in FIG. 5. However, as shown in FIG. 6a, the ram (61) has a first section (62) and a second section (63) wherein the second section has a cross section area smaller than a cross section area of the first section and the first and second sections are joined by a tapered section (64). The ram (61) further has a shoulder (65) for restraining the charge (66).

In operation, as the ram (61) is actuated, the tapered section (64) contacts the hollow preformed charge (65) and imparts a radial displacement to the charge (66). The final part is, of course, hollow. Hence, this method is useful for making hollow parts having external threads including but not limited to pipes and fittings. Additionally, bolts may be made by this process. Of course, the bolts would have a longitudinal hole that could either be left open or filled in.

An alternative embodiment is shown in FIG. 6b wherein the ram (61) is a control ram sliding inside an outer ram (67) while the outer ram (67) holds the charge (66) in place.

Example 1

An experiment was performed using compression molding to form parts having internal buttress threads. Parts were made using a two-part ram (30) as described above in accordance with the present invention. In this example, the outer ram (31) had a taper of 45 degrees.

The charge used for molding was an epoxy resin mixed with graphite reinforcing fiber. The graphite fibers were about 4 micrometers in diameter and chopped to about 0.5 cm (¼ inch) in length. The fraction of reinforcing fiber to resin by weight was from about 55% to about 60%. The charge was preformed to the approximate shape of the finished part.

The molded parts were subjected to measurements of the mechanical shear strength of the buttress threads. The shear strength tests were conducted with the apparatus shown in FIG. 7. A steel test core (71) having four buttress threads (72) and a top surface (73) and encased with a simulated sabot (74) was placed within a test fixture (76). The test fixture (76) has a support ring (77) and a retaining ring (78). The test was performed by applying a force to the top surface (73) of the steel test core (71) and measuring the force required to shear the internal buttress threads on the simulated sabot (74).

Figure 7:
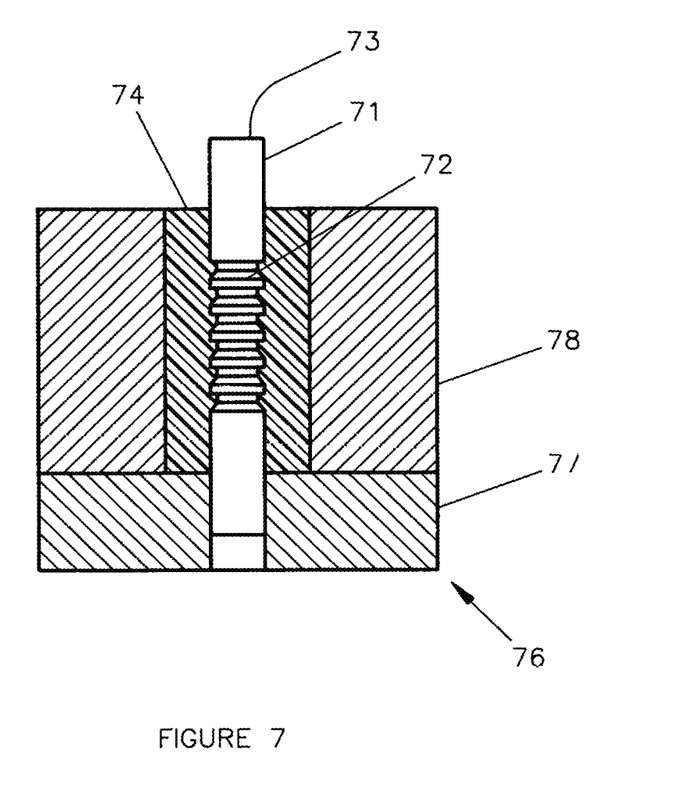
FIG. 7 is a cross sectional view of an apparatus for measuring shear strength of threads.

The retaining ring (78) served a dual purpose of simulating a gun barrel and restraining radial deformation of the simulated sabot (74) so that the buttress threads failed in shear. Without the retaining ring (78), the slight angle on the leading edge of the buttress threads resulted in transmitting a radial force component and subsequent hoop tensile failure of the simulated sabot (74).

Buttress threads made and tested in accordance as described above exhibited shear strengths from about 14,000 psi to about 24,000 psi. Sabots from batches exhibiting shear strengths from about 18,000 psi to about 24,000 psi were selected for test firing. Test firings achieved chamber pressures up to 94,000 psi without failing the sabots.

There is a surprising 2 to 3-fold increase in the average strength of the buttress threads by using the present invention molding than by conventional compression molding.

Figure 8A:
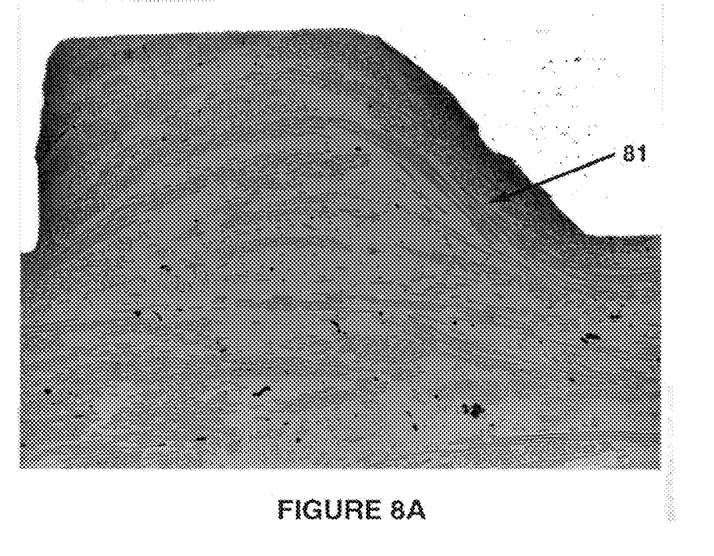
FIG. 8a is a photograph of a cross section of a plastic part molded by prior art compression molding methods.
Figure 8B:
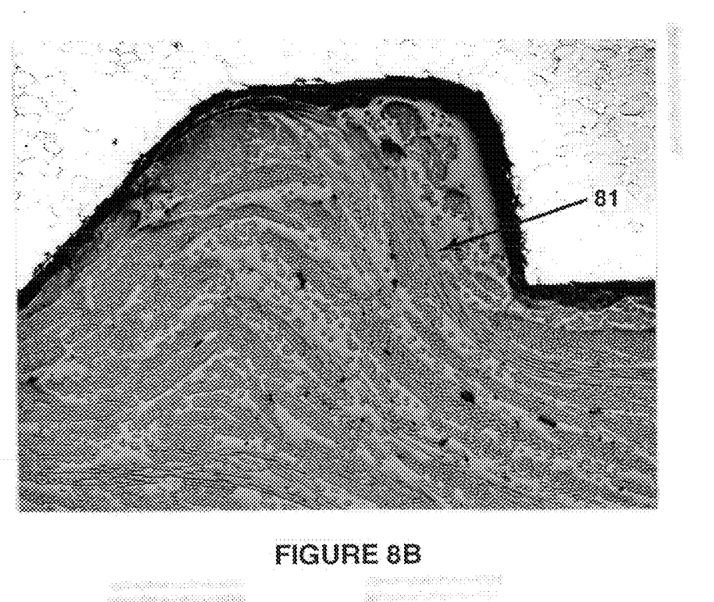
FIG. 8b is a photograph of a cross section of a plastic part molded by compression molding according to the method of the present invention.

The increase in thread strength is attributed to the presence and radial alignment of reinforcing fibers within the threads. FIG. 8a shows a photograph of a cross section of a sabot made by standard compression molding, and FIG. 8b shows a photograph of a cross section of a sabot made by the method and apparatus of the present invention. These sabots were made from material from the same batch of glass fiber reinforced polyamide resin. Most notably, in comparing FIG. 8a to FIG. 8b, one sees a greater fiber density in FIG. 8b as well as radial alignment of a group of fibers (81). The increased density and radial alignment of reinforcing fibers improves the shear strength because the reinforcing fiber length is perpendicular to applied shear forces.

Injection Molding

Figure 9A:
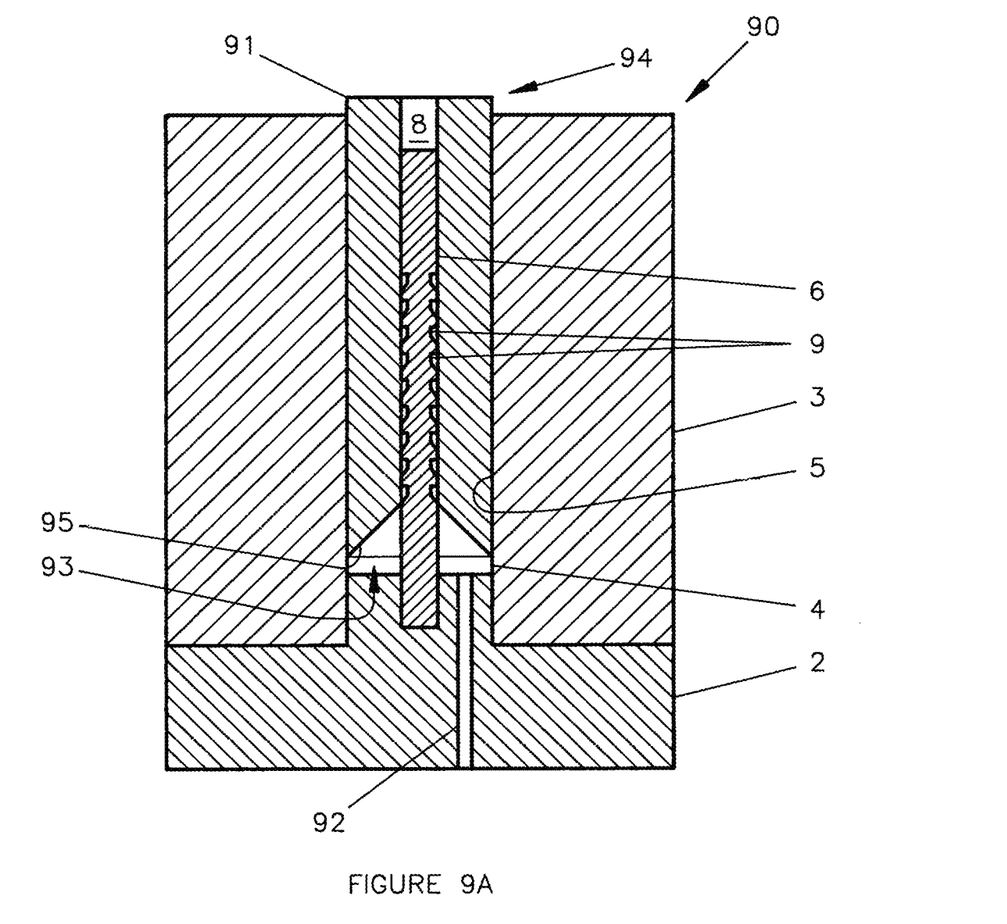
FIG. 9a is a cross sectional view of a first embodiment of an injection mold according to the present invention and prior to injection.

In an injection mold (90) as shown in FIG. 9a, the conventional cap plate (21) is replaced by a ram (91). The ram (91) is inserted into the mold cavity (4) opposite the charge inlet (92), and the ram (91) is moveable along the length of the mold cavity (4). The charge inlet (92) is positioned so that motion of the ram (91) will not block flow.

Figure 9B:
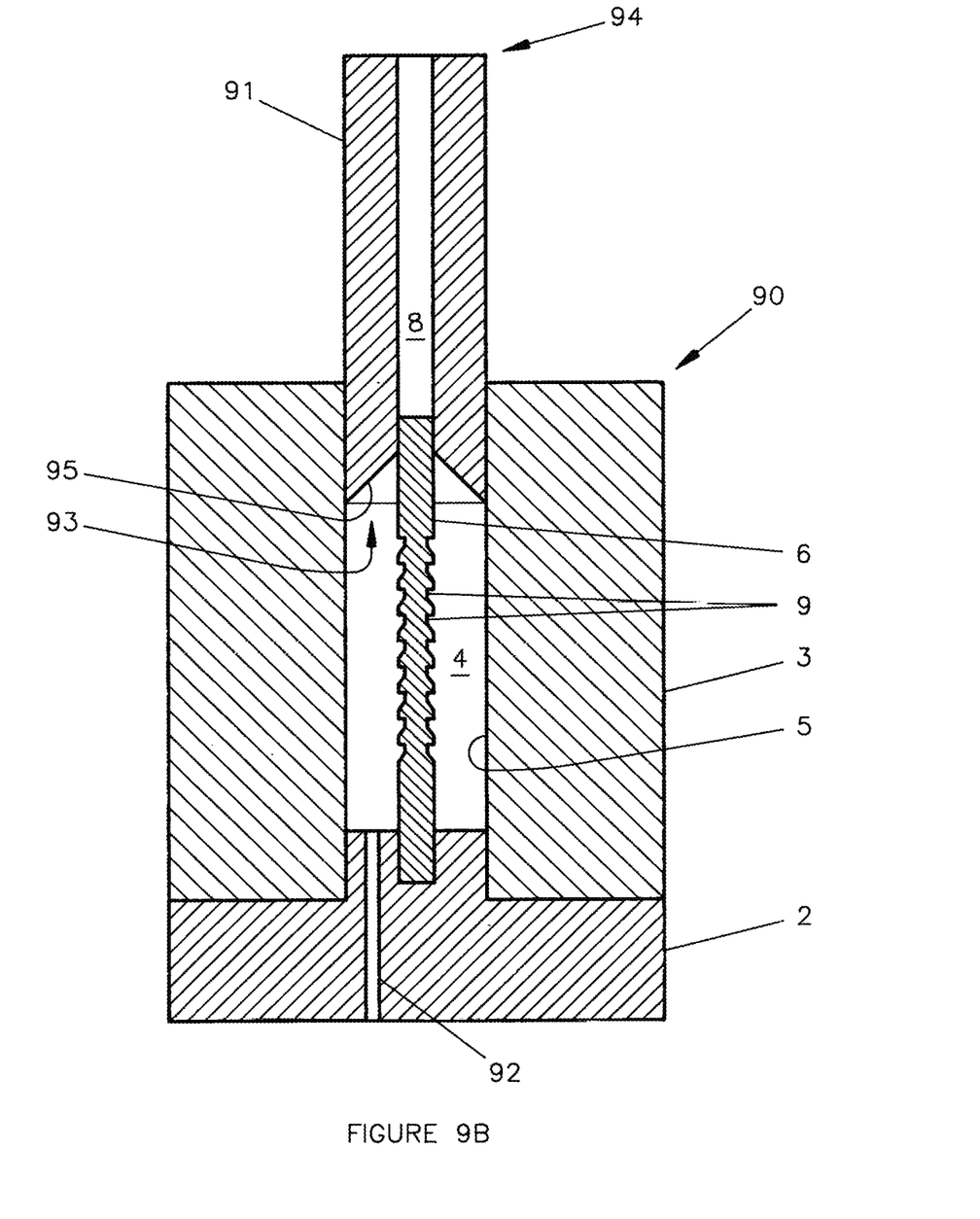
FIG. 9b is a cross sectional view of a first embodiment of an injection mold according to the present invention after injection.

The ram (91) has a length and a first end (93) and a second end (94). The first end (93) may be of any geometry, but it is preferred that a taper (95) be provided to develop lateral or radial displacement of the charge. In operation, the ram (91) starts with its first end (93) near the charge inlet (92) as in FIG. 9a then is withdrawn as the mold cavity (4) is filled. Having the ram (91) in contact with the charge during filling permits exertion of a back pressure and results in a radial displacement of charge that provides a greater amount of fiber reinforcing material within interstices than in conventional injection molding. FIG. 9b shows the ram (91) in its withdrawn position.

As the mold cavity (4) is filled, there is a longitudinal flow of charge as the ram (91) is withdrawn. Longitudinal flow may be reduced or eliminated by admitting the charge through a hole or gate (not shown) through the ram (91).

Figure 10:
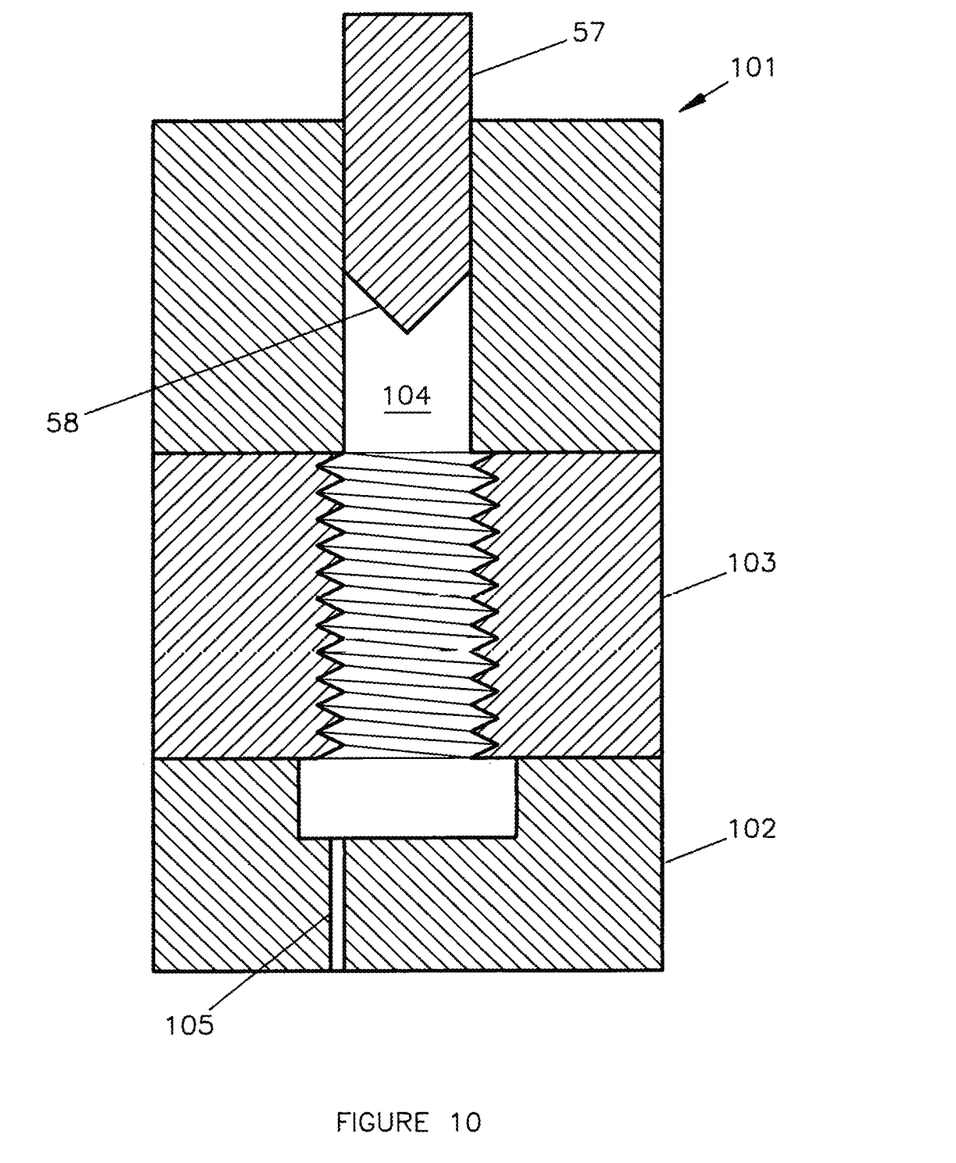
FIG. 10 is a cross sectional view of a second embodiment of an injection mold according to the present invention and prior to injection.

Injection molding is also applicable to parts having external features. FIG. 10 shows a mold (101) for making bolts with external spiral threads. The mold (101) has a base (102) and sidewall (103) forming a mold cavity (104). A gate (105) is provided to admit liquid charge. A moveable ram (57) has a first end (58) within the mold cavity (104). The moveable ram (106) does not require a clearance hole and preferably has a taper on the first end (58). The taper may have a linear or non-linear profile.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for molding a plastic part having a length and at least one thin section perpendicular to the length, said method comprising the steps of:
    heating a mold having a longitudinal centerline, a first closed end, sidewalls forming a mold cavity, and a second end;
    placing a charge of plastic and reinforcing fibers having a charge length within said cavity with said charge length substantially parallel to said longitudinal centerline;
    inserting a ram having a straight section parallel to the longitudinal centerline and a tapered section not parallel to the longitudinal centerline into said second end and contacting said charge with said tapered section; and
    moving said ram parallel to the longitudinal centerline within said cavity wherein said tapered section moves longitudinally along said charge length and in contact with said charge thereby imparting a transverse displacement to said charge wherein said plastic and fibers are displaced together into said thin section thereby preserving a substantially constant fiber density throughout the plastic part.

2. The method as recited in claim 1, wherein moving said ram comprises:
    (a) longitudinally moving an outer ram having a first length, an outer surface and an inner surface, and first and second ends, said first end having a tapered surface, said outer surface sealably slidable within said mold cavity, and
    (b) longitudinally moving an inner ram having a second length shorter than said first length, said inner ram having an outer surface sealably slidable within said inner surface of said outer ram, said inner ram further having an inner surface sealably slidable upon a core having thin sections, wherein said inner ram maintains pressure on the charge while said outer ram is displaced longitudinally along the length of the part.

3. The method as recited in claim 1, wherein moving said ram comprises:
    (a) sealably sliding a dovetailed sidewall within a slotted sidewall, the dovetailed sidewall acting as the ram, the slotted sidewall having a centerline, said dovetailed sidewall having a first inner surface and a second inner surface joined by a taper, wherein said second inner surface is closer to said centerline than said first surface,
    (b) wherein said taper contacts said charge and displaces said charge toward said slotted sidewall.

4. The method as recited in claim 1, wherein said ram comprises:

(a) a first section extending from a first end of said ram, said first section of larger cross section area than a second section extending from a second end of said ram, said first and second sections joined by said tapered section.

\* \* \* \* \*